United States Patent [19]

Takahashi et al.

[11] 4,388,098
[45] Jun. 14, 1983

[54] APPARATUS FOR PRODUCING MULTI-COMPONENT GLASS FIBER PREFORM

[75] Inventors: Shiro Takahashi, Mito; Kazuo Sanada, Chiba; Koichi Inada; Osamu Fukuda, both of Sakura, all of Japan

[73] Assignees: Nippon Telegraph & Telephone Public Corporation; Fujikura Cable Works, Ltd., both of Tokyo, Japan

[21] Appl. No.: 352,568

[22] Filed: Feb. 26, 1982

Related U.S. Application Data

[62] Division of Ser. No. 189,856, Sep. 22, 1980, Pat. No. 4,336,049.

[30] Foreign Application Priority Data

Sep. 26, 1979 [JP] Japan .................................. 54-123677
Jul. 4, 1980 [JP] Japan .................................. 55-91292
Jul. 5, 1980 [JP] Japan .................................. 55-91930

[51] Int. Cl.³ .............................................. B01J 10/00
[52] U.S. Cl. ........................................ 65/157; 422/129
[58] Field of Search .................. 65/3.12, 18.2, 144, 65/157; 427/163; 422/129, 198

[56] References Cited

U.S. PATENT DOCUMENTS

| | | | |
|---|---|---|---|
| 3,883,336 | 5/1975 | Randall | 65/18.2 |
| 4,217,027 | 8/1980 | MacChesney et al. | 65/3.12 X |
| 4,224,046 | 9/1980 | Izawa et al. | 65/3.12 |
| 4,230,744 | 10/1980 | Blankenship | 65/3.12 |

FOREIGN PATENT DOCUMENTS

| | | | |
|---|---|---|---|
| 54-134127 | 10/1979 | Japan | 65/18.2 |
| 54-134129 | 10/1979 | Japan | 65/3.12 |
| 54-160414 | 12/1979 | Japan | 65/18.2 |

*Primary Examiner*—Richard V. Fisher
*Attorney, Agent, or Firm*—Cushman, Darby & Cushman

[57] ABSTRACT

An apparatus for producing a multi-component glass fiber preform includes a multi-conduit burner 31 having five concentric conduits 31a–31e, the center three conduits (a), (b) and (c) being flush with each other at their ends, the fourth conduit d, interposed between the third (c) and outermost conduit (e) extends axially beyond the first three. The burner has a flange 33 to direct the flame onto a substrate.

In operation glass raw material is fed through the innermost conduit (a) by a carrier gas. The material emitted from conduits (a –d) is mixed in a mixing area 32. Glass raw material and a nebulized dopant salt solution are emitted and burned with hydrogen gas depositing particulate glass material or soot on an adjacent substrate to produce a multi-component glass fiber preform.

1 Claim, 9 Drawing Figures

Distance in Radial Direction of Fiber (Arbit.Unit)

Relative Refractive Index

1%

Distance in Radial Direction of Fiber

Relative Refractive Index

Δn%
1.0
0.8
0.6
0.2

−25μm    0    25μm

Distance in Radial Direction of Fiber

Relative Refractive Index 0.9%

Distance in Radial Direction of Fiber

APPARATUS FOR PRODUCING MULTI-COMPONENT GLASS FIBER PREFORM

CROSS REFERENCE TO RELATED APPLICATIONS

This application is a division of our earlier application Ser. No. 189,856 filed Sept. 22, 1980, now U.S. Pat. No. 4,336,049.

BACKGROUND OF THE INVENTION

This invention relates to a method and apparatus for making a multi-component glass fiber preform for fabricating optical fibers for use as transmission lines in communication systems. The term "multi-component preform" denotes a preform composed of a plurality of components.

Conventional optical fibers used as transmission lines of optical communication include silica glass fibers, multi-component glass fibers and ionic crystal fibers. It is required that these optical fibers have low loss, are inexpensive to manufacture and can employ wide band signals. Further, these optical fibers are required to enable easy connection between the fibers and to have a high mechanical strength.

Conventional multi-component glass fibers comprise silica $SiO_2$ and a dopant composed of at least one metal salt selected from the group consisting of alkali metal oxide such as $Na_2O$, alkaline earth metal oxide such as MgO, oxide of lead such as PbO and oxide of lanthanum such as $La_2O_3$. Such multi-component glass fibers can be easily fabricated from a preform since they have a relatively low melting temperature. Such multi-component glass fibers have another advantage that they have low loss since Rayleigh scattering involved is kept to a low level.

Various methods have been proposed for making a multi-component glass fiber preform. With these methods, starting materials are first subjected to extremely high purification and then are mixed together. Thereafter, the so mixed materials are melted by heat. Thus, these methods have been found not simple. Particularly, where powder materials such as sodium salt, potassium salt, barium salt and lead salt are employed, it is not so easy to mix the starting materials homogeneously. In addition, it is necessary to melt the mixed starting materials, for example, in a crucible for a long period of time. As a result, impurities tend to be introduced into the starting materials during this melting operation. The resultant multi-component glass fiber preform has often failed to provide for optical fibers with low loss.

SUMMARY OF THE INVENTION

It is therefore an object of this invention to provide a method for producing a multi-component glass fiber preform which method is quite simple and ensures that a multi-component optical fiber with low loss is provided.

Another object is to provide an apparatus for producing such a preform which apparatus is simple in construction.

According to a first aspect of the invention, there is provided a method for producing a multi-component glass fiber perform which comprises the steps of nebulizing an aqueous solution of at least one metal salt, and reacting the atomized solution and a gaseous glass raw material with oxygen gas at a high temperature to produce particulate glass material deposited on a substrate.

The glass raw material is $SiCl_4$, and if desired, one or more of $GeCl_4$, $POCl_3$ and $BBr_3$ may be added. The aqueous solution is prepared using at least one metal salt selected from the group consisting of alkali metal nitrate, alkali metal carbonate, alkali metal sulfate, alkali metal acetate, alkaline earth metal nitrate, alkaline earth metal carbonate, alkaline earth metal sulfate, alkaline earth metal acetate, lead nitrate, lead carbonate, lead sulfate, lead acetate, lanthanium nitrate, lanthanium carbonate, lanthanium sulfate and lanthanium acetate. The glass raw material and the nebulized solution are mixed together and reacted with oxygen gas at a high temperature to produce particulate glass material or soot deposited on the substrate to form a multi-component glass fiber preform. The aqueous solution of metal salt or salts is nebulized using a nebulizer utilizing supersonic vibration or an nebulizer utilizing gas under pressure. The substrate may be in the form of a bar. In this case, the particulate glass material may be deposited on one end or the outer periphery of the substrate bar of circular cross-section. The substrate may take the form of a tube, in which instance the particulate glass material is deposited on the inner periphery of the substrate tube. During the deposition operation, the bar is axially rotated and moved, and the tube is axially rotated. The preform is drawn axially to form an optical fiber.

The amount of the dopant, i.e., the metal salt or salts contained in the preform can be increased so that the refractive index of the preform can be controlled to form an optical fiber either of the core clad type or the graded index type.

The substrate tube may be made of silica. The particulate glass material is deposited on the inner periphery of the tube to produce a multi-component glass fiber preform. The tube was heated to collapse its hollow portion to provide a solid construction. The preform is drawn axially together with the tube to provide a jacketed optical fiber, the tube constituting the jacket for the optical fiber. The jacketed optical fiber has an increased mechanical strength.

According to a second aspect of the invention, there is provided an apparatus for producing a multi-component glass fiber preform which apparatus comprises a multi-conduit burner having five concentric conduits, the centrally disposed first conduit and the second and third conduits adjacent thereto being flush with one another at their tip ends, the fourth conduit interposed between the third and outermost conduits extending axially beyond them, the first to fifth conduits serving to feed a gaseous glass raw material, a fuel gas, an nebulized aqueous solution of at least one metal salt, an inert gas and oxygen gas, respectively, the burner having a nozzle adapted to be directed to an axially rotating and moving substrate to deposit particulate glass raw material on the substrate. With this apparatus, the dopant content of the glass fiber preform can be increased.

DETAILED DESCRIPTION OF THE INVENTION

As the gaseous glass raw material, silicon chloride $SiCl_4$ gas is used. One or more of germanium chloride gas $GeCl_4$, phosphoryl chloride gas $POCl_3$ and boron bromide $BBr_3$ may be added to $SiCl_4$ to prepare the glass raw material. $SiCl_4$, $GeCl_4$, $POCl_3$ and $BBr_3$ are first purified by precise distillation, and then are gasified. The gasification is carried out by slowly heating a container filled with these materials and bubbling a carrier gas through the materials in the container. High purity argon gas, helium gas or oxygen gas can be used as the carrier gas.

The dopant is at least one metal salt selected from the group consisting of alkali metal nitrate, alkali metal carbonate, alkali metal sulfate, alkali metal acetate, alkaline earth metal nitrate, alkaline earth metal carbonate, alkaline earth metal sulfate, alkaline earth metal acetate, lead nitrate, lead carbonate, lead sulfate, lead acetate, lanthanium nitrate, lanthanium carbonate, lanthanium sulfate and lanthanium acetate. As the alkali metal, lithium, sodium, potassium and cesium can be used. As the alkaline earth metal, magnesium, calcium and barium can be used. The aqueous solution of metal salt or salts is subjected to extremely high purification, using a solvent extraction method or an ion exchange resin. The purified solution is nebulized by a nebulizer utilizing supersonic vibration or a nebulizer utilizing a carrier gas under pressure. Preferably, an inert gas such as argon and helium gases of high purity is used as the carrier gas.

Oxygen gas serving to oxidize the glass raw materials and the nebulized solution should preferably have a purity of more than 99.99%.

The invention will now be described with reference to the drawings.

Figure 1:
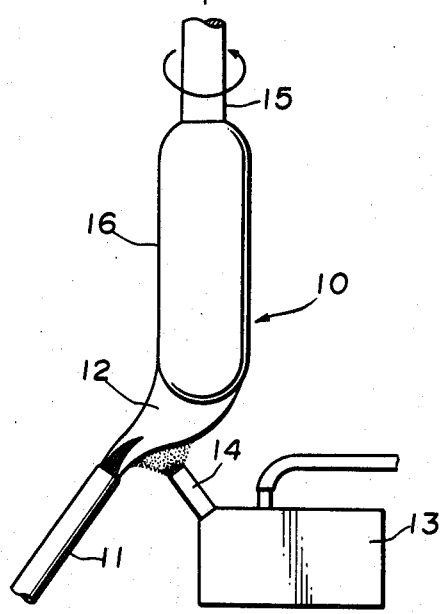
FIG. 1 is a schematic view showing a preform forming apparatus of this invention.

FIG. 1 shows a preform forming apparatus 10 which comprises a multi-conduit burner 11 having a plurality of concentric conduits. A gaseous glass raw material, $H_2$, $O_2$ and a carrier gas such as argon or helium are fed simultaneously through their respective conduits. The hydrogen gas is burnt to form a flame 12. As described above, the glass raw material is composed of $SiCl_4$ and one or more of $GeCl_4$, $BBr_3$ and $POCl_3$. The glass raw material is gasified by the bubbling operation as described above. An aqueous solution of metal salt or salts, which serve as a dopant as described above, is highly purified and charged into a nebulizer 13 utilizing a supersonic vibration. The aqueous solution is nebulized and injected from a nozzle 14 into the flame 12. In the flame 12, the glass raw material and the nebulized material is subjected by the oxygen gas to chemical reactions such as flame hydrolysis and oxidation to produce a multi-component particulate glass material or soot. The particulate material is directed by the flame 12 toward and deposited on the lower end of a substrate bar 15. The particulate material or soot comprises oxides of the glass raw material such as $SiO_2$, $GeO_2$, $B_2O_3$, and $P_2O_5$, oxides of the metal salt such as $Na_2O$, $MgO$ and $PbO$, and oxides such as those containing Si-O-Na bond, Si-O-Mg bond and Si-O-Pb bond. The substrate bar 15 is supported on a lathe (not shown) for axial rotation and upward movement along the axis. The multi-component particulate glass material or soot is deposited on the lower end of the thus rotating and moving bar 15 to form a porous multi-component glass fiber preform 16. During the deposition operation, by changing the flow rates of the glass raw material and the nebulized material, the distance between the nozzle of the burner 11 and the lower end of the substrate bar 15, and the angle of the burner 11 with respect to the substrate 15, the glass fiber preform 16 having a desired refractive index profile can be obtained.

Figure 2:
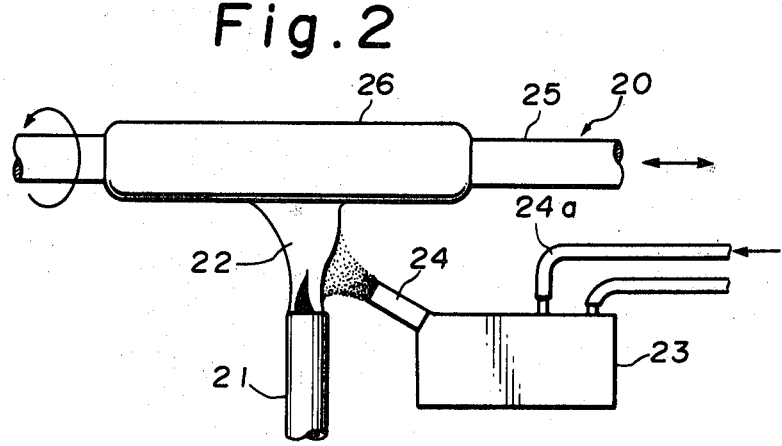
FIG. 2 is a view similar to FIG. 1 but showing a modified apparatus.

FIG. 2 shows a modified preform forming apparatus 20. A gaseous glass raw material, oxygen gas, hydrogen gas and a carrier gas such as argon or helium gas are simultaneously fed through respective conduits of a multi-conduit burner 21, as described above for the burner 11. As described above, the glass raw material is composed of $SiCl_4$ and one or more of $GeCl_4$, $POCl_3$ and $BBr_3$. An aqueous solution of metal salt or salts, purified according to the procedure described above, is contained in a nebulizer 23. Argon gas under pressure is supplied as a carrier gas into the nebulizer 23 through a pipe 24a so that the purified solution is nebulized and injected from the nozzle 24 into a flame 22 of the burner 21. The glass raw material and the nebulized material are oxidized by the oxygen gas to allow their oxides in the form of particular glass material or soot to deposit on the outer periphery of a substrate bar 25 to produce a porous multi-component glass fiber preform 26. The substrate bar 25 is supported on a lathe (not shown) for axially rotation and reciprocal movement along the axis during the deposition operation. By controlling the feed rate of one or more components of the glass raw material and nebulized metal salt solution during the reciprocal movement of the substrate bar 25, the refractive index of the preform 26 can be changed either in a continuous or a stepped manner in the radial direction of the substrate bar 25.

Figure 3:
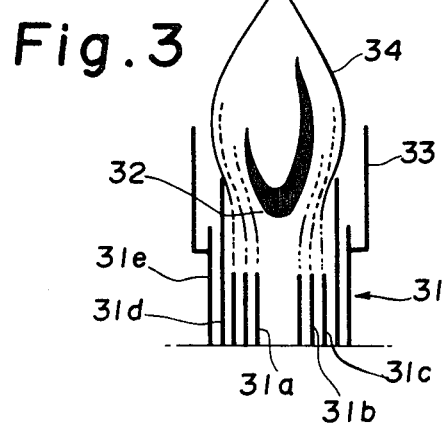
FIG. 3 is a schematic view of a multi-conduit burner.

FIG. 3 shows a multi-conduit burner 31 having five concentric conduits 31a to 31e. The first to fifth conduits 31a to 31e serve to feed the above-mentioned glass raw material, hydrogen gas, the above-mentioned nebulized metal salt solution, argon gas and oxygen gas, respectively. The gaseous glass raw material is fed through the centrally disposed first conduit 31a by a carrier gas such as argon gas. The first to third conduits 31a to 31c are flush with one another at their tip ends. The fourth conduit 31d is about 15 to 20 mm longer than the first to third conduits and also is about 5 mm longer than the fifth conduit 31e. With this construction, a mixture area 32 is defined by the fourth conduit 31d and the tip ends of the first to third conduits 31a to 31c. The mixture area 32 serves to sufficiently mix the materials emitted from the first to fourth conduits 31a to 31d. A flange member 33 is mounted around the outermost or fifth conduit 31e and extends axially beyond the fourth conduit 31d. Hydrogen gas is burnt to form a flame 34.

Figure 4:
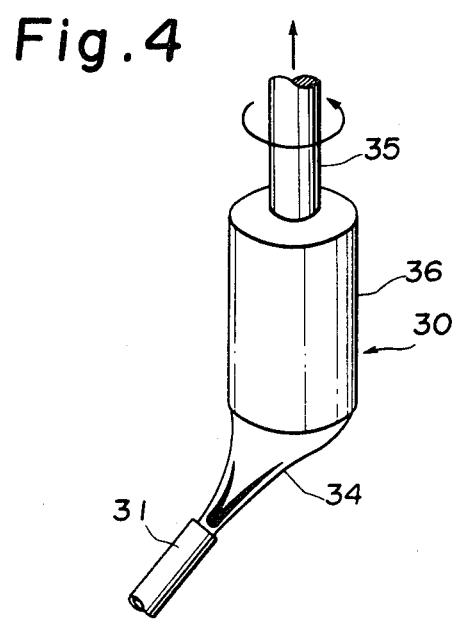
FIG. 4 is a view similar to FIG. 1 but showing another modified apparatus.

The glass raw material and the nebulized metal salt solution, emitted respectively from the conduits 31a and 31c, are adequately mixed together and directed into the flame 34 so that the particulate glass raw material or soot is produced by oxidization and deposited on the lower end of a substrate bar 35 to produce a porous multi-component glass fiber preform 36, as shown in FIG. 4 which schematically illustrates a further modified preform forming apparatus 30. The substrate bar 35 is supported on a lathe (not shown) for axial rotation and movement along the axis during the deposition operation. With this method, the dopant content of the obtained preform can be easily increased to a desired level. The substrate bar 35 may be arranged for horizontal reciprocal movement so that the glass fiber preform is formed around the outer periphery of the substrate. Further, as described above, by controlling the feed rate of one or more components of the materials supplied through the multi-conduits burner 31, the refractive index of the preform can be controlled. Also, as described above, by changing the flow rates of the glass raw materials and nebulized materials, the distance between the nozzle of the burner 31 and the lower end of the substrate bar 35, and the angle of the burner 31 with respect to the substrate 35, the glass fiber preform having a desired refractive index profile can be obtained.

Figure 5:
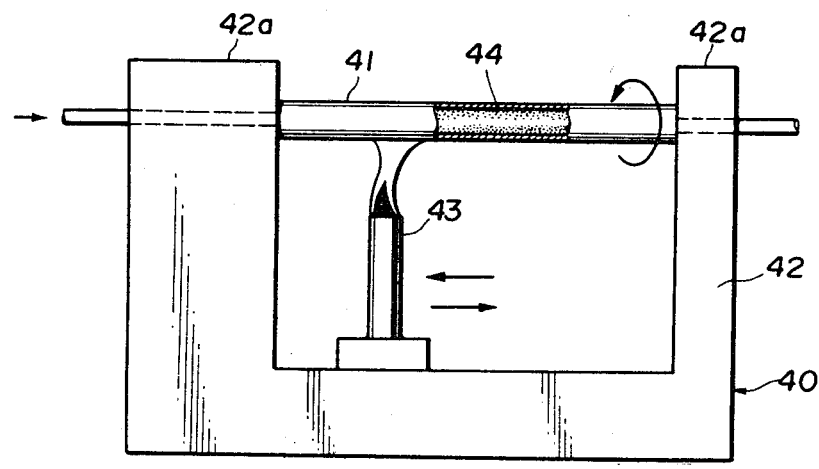
FIG. 5 is a view similar to FIG. 1 but showing a further modified apparatus.

FIG. 5 shows a further modified preform forming apparatus 40 which employs a process commonly known in the trade as "modified chemical vapor deposition process". An elongated hollow substrate 41 in the form of silica tube is used. The substrate tube 41 is supported by spaced support portions 42a, 42a of a lathe 42 for axial rotation. A burner 43 using $H_2$ and $O_2$ is mounted on the lathe 42 beneath the substrate tube 41 for reciprocal movement therealong to heat the rotating tube 41. The tube 41 has a smooth bore or inner peripheral wall which is cleaned. The above-mentioned gaseous glass raw material and nebulized solution, oxygen gas and the carrier gas are introduced into the bore of the rotating tube 41. The glass raw material and nebulized material are heated by the moving burner 43 so that the particulate glass material or soot is produced through chemical reactions such as flame hydrolysis and oxidization and is deposited on the inner peripheral surface of the silica tube 41 to form a porous multi-component preform 44. As described above, by controlling the feed rate of one or more components of the glass raw material and nebulized metal salt solution during the reciprocal movement of the burner 43, the refractive index of the preform 44 can be changed either in a continuous or a stepped manner.

For fabricating a multi-component glass fiber from the multi-component glass fiber preforms produced according to the procedures shown in FIGS. 1 and 4, the preform is heated to a temperature above a melting point for vitrification to provide a transparent glass preform. The vitrified preform is then drawn to form an optical fiber. More specifically, where a core preform and a cladding preform are formed on separate substrate bars, the two preforms are introduced respectively into concentrically disposed inner and outer chambers of a crucible, e.g., a platinum crucible and are melted. The preforms thus treated are drawn to provide a mutli-component optical glass fiber having a core portion and a cladding portion. Alternatively, a core preform is formed on the lower end of the substrate bar, and thereafter a cladding preform is formed on the core preform to provide an integral preform. This integral preform is heated for vitrification to obtain a transparent preform. This transparent preform is drawn to provide a multi-component optical glass fiber.

For fabricating a glass fiber from the preform prepared according to the procedure shown in FIG. 2, the preform is vitrified to obtain a transparent glass preform in the manner described above. Then, the substrate bar is removed from the preform, and this hollow preform is heated to collapse the hollow portion to provide a solid construction. In the case of the preform of which refractive index is varied in the radial direction, the preform is simply drawn to form a multi-component optical glass fiber. In the case of the preform of which refractive index is constant in the radial direction, the preform is formed into a rod of a predetermined diameter. Then, a cladding is applied over the preform, and the preform with the cladding is drawn to provide a multi-component glass fiber.

For fabricating a glass fiber from the preform prepared according to the procedure shown in FIG. 4, the substrate tube, in which the preform is formed, is heated to collapse the hollow portion to form a solid structure. The preform with the silica tube is drawn axially from one end to form a multi-component optical glass fiber. The drawn tube 41 serves as a jacket for the optical fiber and increases the mechanical strength of the fiber.

The invention will now be illustrated by the following examples:

EXAMPLE 1

An aqueous solution of 30% by weight $NaNO_3$ of extremely high purity was prepared, using an ion exchange resin. The purified aqueous solution was charged into a nebulizer 13 of a preform forming apparatus 10 shown in FIG. 1, the nebulizer 13 utilizing supersonic vibration. $SiCl_4$, $GeCl_4$, $BBr_3$ and $POCl_3$ serving as gaseous glass raw materials were fed through a first conduit of a multi-conduit burner 11 at the flow rates of 200 cc per minute, 100 cc per minute, 50 cc per minute and 20 cc per minute, respectively, the multi-conduit burner 11 having a plurality of concentrically disposed conduits. Hydrogen gas serving as a fuel gas and oxygen gas were also fed separately through a second and a third conduit at the flow rates of 4000 cc per minute and 6000 cc per minute, respectively, the hydrogen gas being burnt to form a flame 12. The purified aqueous solution was subjected to supersonic vibration of 80 kHz by the nebulizer 13, having a power of 50W, to be nebulized at the nozzle 14 of the nebulizer 13 and injected into the flame 12 so that the glass raw materials and the nebulized material were oxidized by the oxygen gas to allow their oxides in soot form to deposite on the lower end of an axially rotating and moving substrate bar 15 to produce a porous multi-component glass fiber preform 16 for a core. The aqueous solution to be nebulized was fed at a rate of 50 cc per minute.

Then, according to the procedure described above, a porous multi-component glass fiber preform for a cladding was also prepared, using $SiCl_4$ (flow rate: 200 cc per minute), $GeCl_4$ (50 cc per minute), $BBr_3$ (50 cc per minute), and $POCl_3$ (20 cc per minute) serving as glass raw materials, hydrogen gas (4000 cc per minute), oxygen gas (6000 cc per minute) and an aqueous solution of 30% by weight $NaNO_3$ nebulized at the rate of 40 cc per minute.

Figure 6:
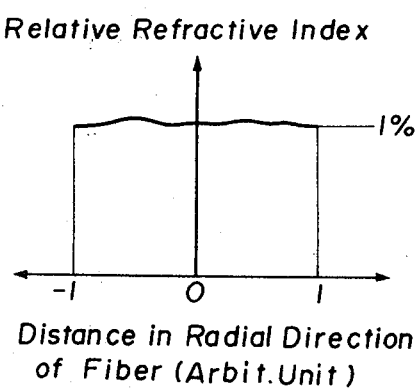
FIGS. 6 to 9 are graphs showing the refractive index profile in the direction of diameter of optical fiber preforms provided in accordance with the present invention.

The thus obtained core preform and cladding preform were heated in a furnace, respectively, for vitrification to obtain two transparent glass performs. The vitrified core preform and cladding preform were introduced respectively into concentrically-disposed inner and outer chambers of a platinum crucible. Then, the two preforms were drawn at the rate of 20 cm per minute at a temperature of 800° to fabricate a multi-component optical glass fiber having a core portion and a cladding portion. The thus obtained optical fiber exhibited a refractive index profile of the step type as indicated by a graph in FIG. 6.

EXAMPLE 2

A multi-component optical glass fiber was obtained according to the procedure of Example 1, except that an aqueous solution of 32% by weight KNO$_3$ was used instead of the aqueous solution of NaNO$_3$. The thus obtained optical fiber, like the optical fiber of Example 1, exhibited a refractive index profile of the step type.

EXAMPLE 3

An aqueous solution of 30% by weight MgSO$_4$ of extremely high purity and an aqueous solution of 30% by weight C$_5$SO$_4$ of extremely high purity were prepared, using an ion exchange resin. The two solutions were mixed in equal amounts, and the resultant mixture solution was charged into a nebulizer 23 of a preform forming apparatus 20 shown in FIG. 2. Argon gas under pressure serving as a carrier gas was fed through a conduit 24a to nebulize the solution.

SiCl$_4$ and POCl$_3$ serving as gaseous glass raw materials, H$_2$ and O$_2$ were fed through respective conduits of a multi-conduit burner 21, as described above for the burner 11, at the flow rates of 100 cc per minute, 50 cc per minute, 2200 cc per minute and 3000 cc per minute. The hydrogen gas was burnt to form a flame 22. The mixture solution was nebulized at the nozzle 24 of the nebulizer 23 at a rate of 0.3 g per minute and injected into the flame 22 so that the glass raw materials and the nebulized material were oxidized by the oxygen gas to allow their oxides in soot form to deposit on the outer peripheral surface of a substrate bar 25, rotating about its axis and reciprocally moving along its axis, to produce a porous multi-component glass fiber preform 26. The substrate bar 25 was rotated at a rate of 20 r.p.m. and reciprocally moved at a speed of 300 mm per minute. During the deposition operation, in order to continuously change the refractive index of the preform in its radial direction to obtain an optical fiber of the graded index type, the amount of SiCl$_4$ fed to the burner 21 was increased by 5 cc per minute in the range of between 100 cc per minute and 200 cc per minute every one reciprocal movement of the substrate 10.

Figure 7:
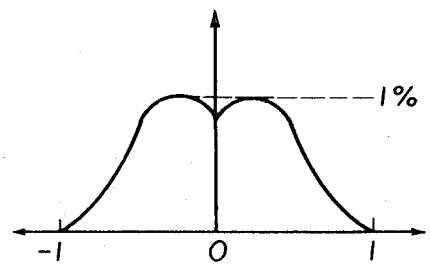

The thus obtained preform 26 was heated for vitrification in a carbon resistor furnace at a temperature of about 1400° C. to obtain a transparent glass preform. Then, the substrate bar 25 is removed from the preform, and the resulting hollow preform was heated to collapse the hollow portion to provide a solid construction. The solid preform was drawn from one end thereof to produce a multi-component optical glass fiber of the graded index type. The refractive index profile of the optical fiber was matched substantially to a parabolic curve as plotted in FIG. 7.

EXAMPLE 4

Figure 8:
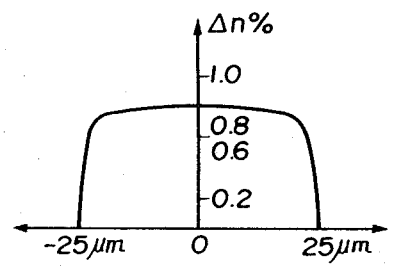

A multi-conduit burner 31 (FIG. 3) having five concentric conduits 31a to 3e was employed. SiCl$_4$, POCl$_3$ and Ar were fed through the first or central conduit 31a at flow rates of 120 cc per minute, 10 cc per minute and 50 cc per minute, respectively, SiCl$_4$ and POCl$_3$ constituting glass raw materials. H$_2$ was supplied through the second conduit 31b at a flow rate of 3 l per minute. Pb(NO$_3$)$_2$ and H$_2$O mixed in the weight ratio of 3:10 was fed through the third conduit 31c at a rate of 0.28 g per minute, the mixture being in nebulized form. Ar was fed through the fourth conduit 31d at a rate of 4 l per minute. O$_2$ was fed through the fifth conduit 31e at a rate of 3 l per minute. H$_2$ was burnt to form a flame 34 and the glass raw material and the nebulized mixture were oxidized by the oxygen gas to allow their particulate oxides to deposit on the lower end of a substrate bar 35 to produce a multi-component glass fiber preform 36 (FIG. 4). The substrate bar 35 was rotated axially at a rate of 20 r.p.m. and moved upwardly at a speed of 40 mm per hour. The thus produced preform was passed through a carbon resister furnace, maintained at a temperature of about 1,300° C., for vitrification to obtain a transparent glass preform. The transparent preform was drawn by a lathe to have a predetermined diameter or cross-section, and a tube of silica was fitted over the thus drawn material. Then, the drawn material with the silica tube was heated at a temperature of about 2,000° C. to obtain a multi-component optical glass fiber. The refractive index profile of the optical fiber is shown in FIG. 8.

EXAMPLE 5

A multi-component optical glass fiber of the graded index type was prepared, using a preform forming apparatus 40 shown in FIG. 5. An aqueous solution of 30% by weight Pb(NO$_3$)$_2$ of high purity and an aqueous solution of 20% by weight Ba(CH$_3$COO)$_2$ of high purity were prepared, using either a solvent extraction method or an ion exchange resin. The two solutions were mixed in equal amounts, and the resultant mixture solution was nebulized by an nebulizer (not shown) using argon as a carrier gas and was introduced into a tube 41 of silica. The amount of the argon gas supplied was increased by 8 cc per minute in the range of between 0 cc per minute and 400 cc per minute every one reciprocal movement of a burner 43 along the tube 41, so that the amount of the nebulized mixture supplied was controlled to the range of between 0 g per minute and 0.5 g per minute.

Figure 9:
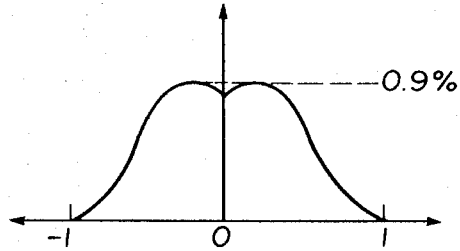

Simultaneously with the supply of the nebulized mixture into the tube 41, SiCl$_4$ and POCl$_3$, serving as glass raw materials, and O$_2$ were fed into the tube 41 at flow rates of 150 cc per minute, 30 cc per minute and 200 cc per minute, respectively. The tube 41 was supported by a lathe 42 and axially rotated at a rate of 20 r.p.m. The tube 41 had an inner diameter of 18 mm, and the length of the tube between opposed support portions 42a, 42a was 1 m. The tube 41 was heated by the burner 43 using H$_2$ and O$_2$ which burner was reciprocally moved along the tube 41 at a speed of 30 cm per minute. The glass raw material and the nebulized material in the tube 41 were oxidized by the oxygen gas in the tube to allow their particulate oxides to deposite on the inner periphery of the tube 41 to produce a multi-component glass fiber preform 44. After the burner 43 reciprocally moved along the tube 41 fifty times, the introduction of the materials into the tube 51 was stopped. Then, the tube 41 was heated to 1,900° C. to collapse the hollow portion of the tube to provide a solid structure. The solid preform with the tube was drawn at 2,100° C. at a speed of 30 m per minute to produce a jacketed multi-component optical glass fiber. Thus, the tube 41 is simultaneously drawn to form jacket for the optical fiber. The refractive index profile of the optical fiber was matched substantially to a parabolic curve as plotted in FIG. 9.

What is claimed is:

1. Apparatus for producing a multi-component glass fiber preform, which comprises a multi-conduit burner having five concentric conduits, the centrally disposed first conduit and the second and third conduits adjacent thereto being flush with one another at their tip ends, the fourth conduit interposed between the third and outermost conduits extending axially beyond them, the first to fifth conduits serving to feed a gaseous glass raw material, a fuel gas, a nebulized aqueous solution of at least one metal salt, an inert gas and oxygen gas, respectively, and said burner having a nozzle adapted to be directed to a substrate.

* * * * *